(12) United States Patent
Yrieix

(10) Patent No.: US 12,103,085 B2
(45) Date of Patent: Oct. 1, 2024

(54) SOLID METALLIC COMPONENT AND METHOD FOR PRODUCING SAME

(71) Applicant: Electricite de France, Paris (FR)

(72) Inventor: Bernard Yrieix, Moret sur Loing (FR)

(73) Assignee: Electricite de France (FR)

( * ) Notice: Subject to any disclaimer, the term of this patent is extended or adjusted under 35 U.S.C. 154(b) by 67 days.

(21) Appl. No.: 17/778,578

(22) PCT Filed: Nov. 19, 2020

(86) PCT No.: PCT/FR2020/000263
§ 371 (c)(1),
(2) Date: May 20, 2022

(87) PCT Pub. No.: WO2021/099697
PCT Pub. Date: May 27, 2021

(65) Prior Publication Data
US 2022/0402241 A1    Dec. 22, 2022

(30) Foreign Application Priority Data

Nov. 22, 2019   (FR) ...................................... 1913081

(51) Int. Cl.
*B33Y 80/00* (2015.01)
*B22F 7/06* (2006.01)
*B32B 15/01* (2006.01)
*B33Y 10/00* (2015.01)
*C22C 38/02* (2006.01)
*C22C 38/22* (2006.01)
*C22C 38/58* (2006.01)
*F22B 37/00* (2006.01)
*G21C 5/10* (2006.01)

(52) U.S. Cl.
CPC .............. *B22F 7/06* (2013.01); *B32B 15/011* (2013.01); *B33Y 80/00* (2014.12); *C22C 38/02* (2013.01); *C22C 38/22* (2013.01); *C22C 38/58* (2013.01); *F22B 37/002* (2013.01); *G21C 5/10* (2013.01); *B33Y 10/00* (2014.12)

(58) Field of Classification Search
CPC ..................................................... B32B 15/011
See application file for complete search history.

(56) References Cited

U.S. PATENT DOCUMENTS

| 9,976,815 B1 | 5/2018 | Roper et al. |
| 10,395,783 B2 | 8/2019 | Singh et al. |
| 2016/0232996 A1 | 8/2016 | Liszkai |
| 2018/0226162 A1 | 8/2018 | Liszkai et al. |

OTHER PUBLICATIONS

International Search Report for Application No. PCT/FR2020/000263 mailed Mar. 5, 2021, 2 pages.

*Primary Examiner* — Adam Krupicka
(74) *Attorney, Agent, or Firm* — Lerner David LLP

(57) ABSTRACT

The invention relates in particular to a solid metallic component. This component (1) is particularly notable in that it comprises a core (5) and an external shell (3) which surrounds said core (5) in all directions, this core (5) and this shell (3) being made of different grades of steel, the steel of said core (5) having martensite and bainite critical cooling rates lower than those of the steel or steels of said shell (3).

12 Claims, 2 Drawing Sheets

[Fig. 1]
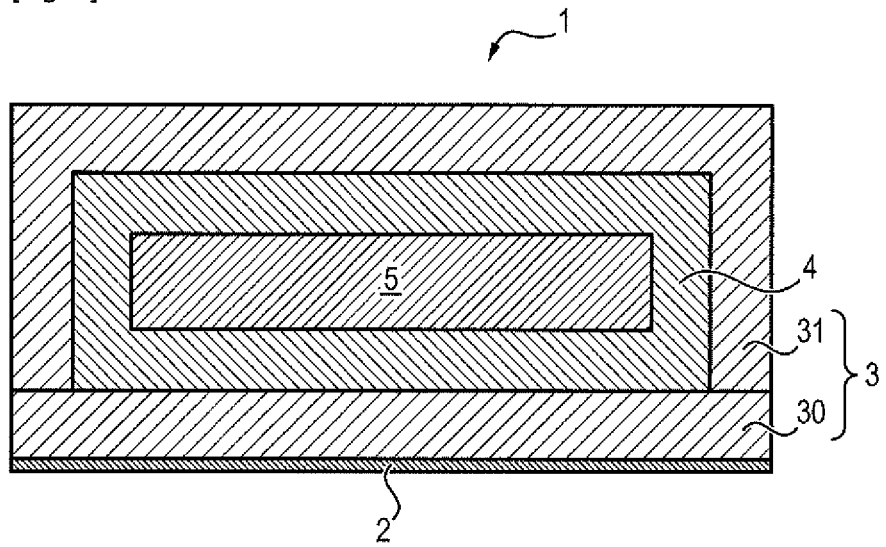
[Fig. 2]
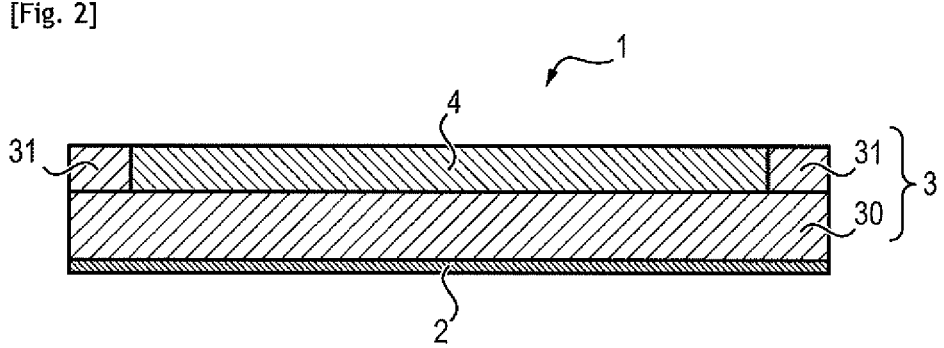
[Fig. 3]
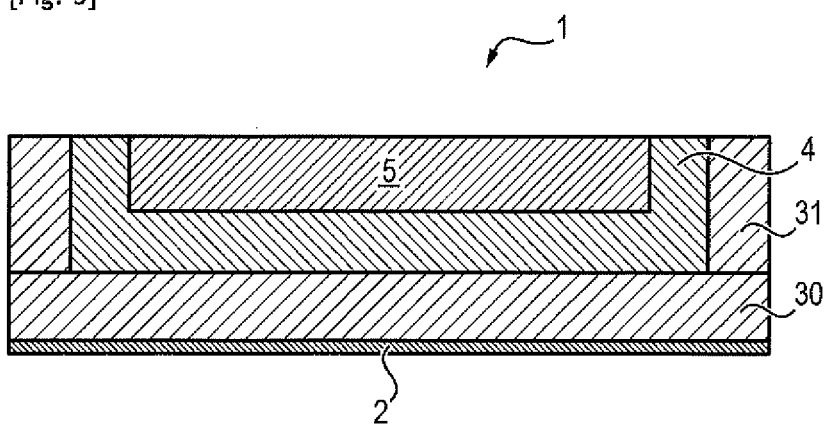

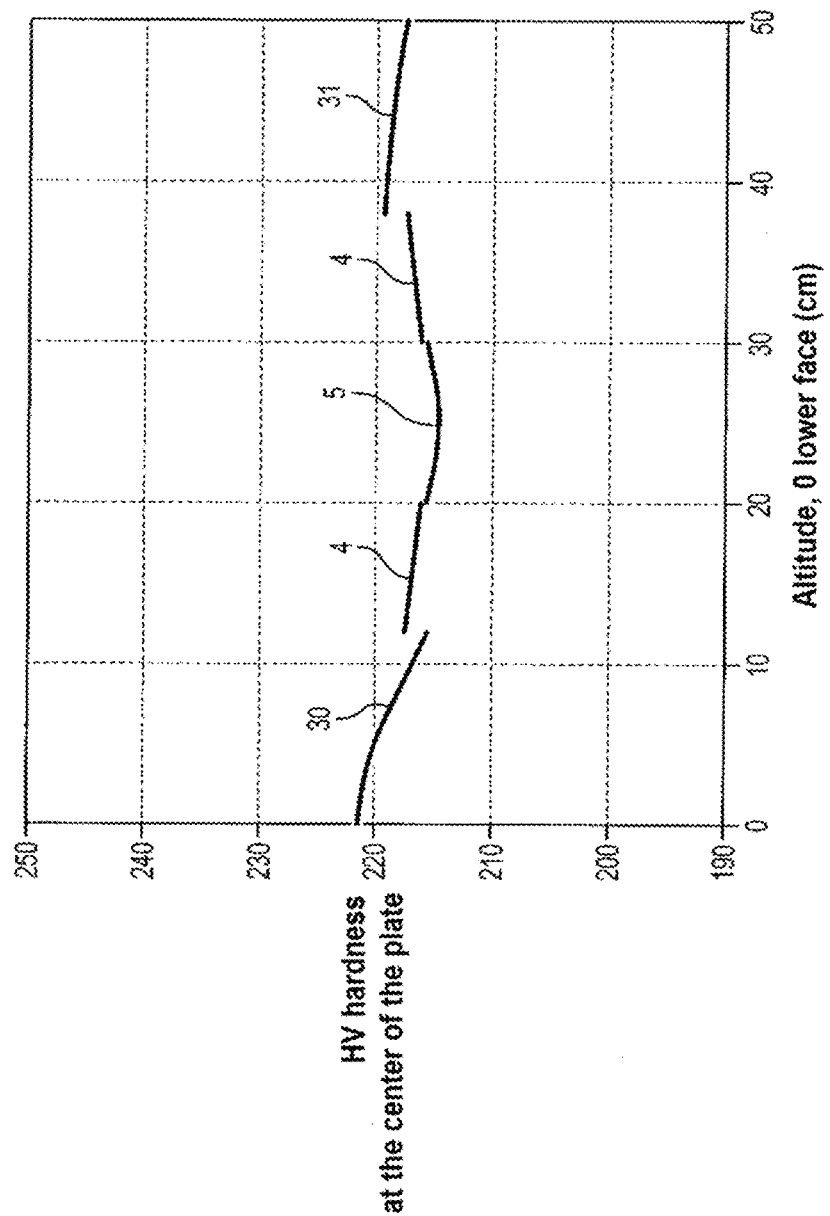
[Fig. 4]

SOLID METALLIC COMPONENT AND METHOD FOR PRODUCING SAME

CROSS-REFERENCE TO RELATED APPLICATIONS

The present application is a national phase entry under 35 U.S.C § 371 of International Application No. PCT/FR2020/000263 filed Nov. 19, 2020, which claims priority from French Patent Application No. 1913081 filed Nov. 22, 2019, all of which are hereby incorporated herein by reference.

GENERAL TECHNICAL FIELD

The present invention lies in the general field of the manufacture of solid metal components.

This invention finds a non-exclusive application in the manufacture of metal components of large dimensions and great thickness such as, for example, those found in the lower part of steam generators for nuclear power plants, called "tube plates".

STATE OF THE ART

The function of such a steam generator is to transfer the calories of the water—hot source—from a reactor of a nuclear power plant via thousands of U-shaped tubes in contact with a feed water which will be put in vapor state in order to be output to a circuit (called "secondary" circuit) which will actuate turbines driving the rotor of an alternator to produce electricity. After having released its calories into the steam generator, the water flows back to the reactor inlet.

Said thousands of tubes have very large lengths, and are held at regular heights by spacers welded into a tube plate revealing holes providing a free flow of water in and out. A partition is fitted in what is called a "water box" at the bottom of the tube plate to separate the various circulating waters.

The tube plate of steam generators in pressurized water power plants is a thick (50 to 60 cm) and large diameter forging, drilled with thousands of holes for the passage of exchange tubes. As it is highly mechanically stressed due to the pressure difference on either side, its rigidity is obtained by its thickness and by the mechanical properties of the material of which it is made, namely a low alloy steel of the carbon manganese class.

The extremely solid nature of this component is the source of two main manufacturing difficulties:
the metallurgical and chemical homogeneity within the component, originating from the required ingot size and the low level of wrought requested by the final thickness, is quite bad, which leads to variations of the mechanical properties in the mass thereof;
the combination of very great thickness and limited hardenability of the steel used does not allow, in the plate core after a quality thermal processing, for a microstructure of tempered bainite or martensite, which is the guarantee of the best compromise between resistance and tenacity.

Typically, in the center of the component, the yield strength, the tensile strength and the ductile bearing are lowered while the resilience transition temperature is increased by more than 50° C.

Improving these mediocre properties would make it possible either to design plates that are less solid and therefore easier to manufacture, or to provide even greater safety margins.

In a related manner, a gain in lead time and in freedom of supply are also strongly expected.

The basic functions required for this tube plate are essentially:
a bending resistance under differential pressure charge;
its mechanical stability during manufacture and operation to receive and maintain the tube bundle;
its ability to be welded on the ferrules and the bowl of the steam generator;
its ability to be clad by welding with stainless steel or nickel-based alloy.

Thus, to simplify, the compromise to be sought relates to three properties:
elastic limit and tensile strength;
tenacity and resilience;
weldability.

Regarding this last property (weldability), it will be noted that the Carbon equivalent (C*) of the steel, calculated according to EN 10028-2, is approximately from 0.52% (typical value) to 0.62% (for steel "18 MND 5", which is optimized for thermal treatment), which represents a target value that should not be exceeded too much, otherwise the preheating temperatures of the various welds could be compromised, but above all there could be a risk of cold cracking.

The state of the art for such manufacturing indicates that, for the first defect mentioned above (poor homogeneity), it is difficult to achieve ingot casting, dropping of the segregation zones, and plate forging, and there is a risk of waste.

It also shows that there is no solution to the second problem (limited hardenability) due to the necessary compromise between mechanical properties, hardenability and weldability, apart from a change in steel grade.

The object of the present invention is to overcome these drawbacks.

Presentation of the Invention

To this end, the invention relates firstly to a solid metal component, characterized in that it comprises a core and an outer shell which surrounds said core in all directions, these core and shell being made of different grades of steel, the steel of said core exhibiting martensite and bainite critical cooling rates lower than those of the steel or steels of said shell.

Thanks to these characteristics of the invention, the component obtained has especially homogeneous mechanical characteristics. This is particularly the case regarding the hardness. On the other hand, resilience and toughness are high.

According to other advantageous and non-limiting characteristics of this component, said core is itself surrounded by at least one inner shell, this inner shell being surrounded by said outer shell, the steel of said core having martensite and bainite critical cooling rates lower than those of the steel of said inner shell, these rates of said inner shell being themselves lower than those of said outer shell.

The invention also relates to a method for manufacturing such a component.

This method is characterized in that it comprises a step of depositing said steels by additive manufacturing or welding, on a base previously manufactured, in order to form at the same time said core and the remainder of said shell or shells respectively.

According to other non-limiting and advantageous characteristics of this method:

the steel grade of the remainder of said outer shell is the same as that of said base;

the steel grade of the remainder of said outer shell is different from that of said base, these two grades exhibiting martensite and bainite critical cooling rates that are identical or almost identical;

said base is made by forging or rolling;

said base is made by additive manufacturing or welding.

DESCRIPTION OF FIGURES

Other characteristics and advantages of the invention will become apparent from the description which will now be given, with reference to the accompanying drawings, which represent, for illustrative but not limitative purposes, various possible embodiments thereof.

In these drawings:

FIG. 1 is a schematic view, along a vertical section plane, of a component according to the present invention;

FIG. 2 is a schematic view illustrating a step in the manufacture of the component of FIG. 1;

FIG. 3 is a schematic view illustrating the manufacturing process of the component, at a later stage than the one shown in FIG. 2;

FIG. 4 is a diagram showing the hardness variation of a component according to the invention, at the center thereof, after quenching and tempering, using the materials indicated in Table I to which reference will be made hereafter.

DETAILED DESCRIPTION OF THE INVENTION

As it will be seen from the following, the present invention is based on a combination of carefully organized materials and a manufacturing process which, after quality treatment, provides high mechanical properties homogeneous throughout the thickness of the component thus generated.

Throughout the present description, including the claims, the term "component" is understood to mean both a plate, i.e. an object whose thickness is smaller than its length and width, and any other three-dimensional object, for example parallelepipedal or cylindrical, having a thickness greater than its other dimensions.

According to the invention and as shown in FIG. 1, a disk-shaped solid metal plate 1 is involved.

It is shown being positioned on a thickness 2 of stainless steel or of an alloy known under the trademark Inconel. Unlike what is shown in FIGS. 2 and 3, this thickness is preferably related to the plate 1, after it has been manufactured.

When the plate is a steam generator bottom plate (as explained above), the thickness 2 is in contact with the primary water and thus forms a corrosion barrier for the remainder of the plate 1.

This plate 1 comprises a core 5 and an outer shell 3 which surrounds said core 5 in all directions. This core 5 and this shell 3 are made of different grades of steels.

More precisely, in the example shown here, the core 5 is itself surrounded by an inner shell 4, this inner shell 4 being surrounded by said outer shell 3.

An embodiment not shown could involve a single outer shell 3 in direct contact with the core or, on the contrary, more than two shells.

In any event and according to the invention, the steel grades of the core 5 and of each shell 3 and 4 are different, and the steel of said core 5 has martensite and bainite critical cooling rates lower than those of the steel of the shell 4 which surrounds it, and so on for each shell that surrounds the previous shell.

Thus, in the case of FIG. 1, said rates of the inner shell 4 are lower than those of the outer shell 3.

This plate 1 can be manufactured according to the method statement detailed below.

First, a heavy plate or base 30 with a typical thickness generally between 10 to 15 cm is forged or rolled. Such thicknesses ensure a very good metallurgical quality without macro-segregation. Optionally, this plate 30 can be manufactured according to the same method statement as the one which will be described below.

The remainder of the plate 1 is said to be "deposited", and is obtained by additive manufacturing or welding. This means that the entire thickness of the plate 1 is gradually increased.

If one refers to FIG. 2, this means that after having formed the base 30, not only the lower part of the shell 4, but also the side wall 31 of the shell 3 (the latter being formed at the end of the gathering of the base 30 and the side wall 31), are built simultaneously thereon.

This operation is preferably carried out by means of one of the following methods or a combination thereof:

Gas Metal Arc Welding (GMAW) or Metal Inert Gas/Active inert Gas (MIG/MAG);

Submerged Arc Welding (SAW) or submerged arc welding with solid flux ("ASF") or else wire or strip under flux;

Electroslag Welding (ESW) or vertical slag welding.

In these deposition methods, the encompassed variations are preferably the following metal buildups which have in common high deposition rates (kg/h):

tandem (two wires or strips with their own power supply);

multi-wire (several wires with their own power supply);

twinned (2 wires or strips on the same power supply);

co-buildup without power supply;

combinations of the above techniques;

hot (i.e. preheated) metal buildups.

The buildup materials are preferably chosen with an equivalent carbon less than 0.65%, typically 0.62%, and exhibit very low diffusible hydrogen levels, in order to prevent from cold cracking, with preheating temperatures as low as possible.

The fluxes used in the SAW and ESW methods will preferably be basic fluxes which allow better properties of the molten zones.

The concept of choice of steel grades with regard to the dimensions and the possibilities of thermal treatment of the plate is to select grades that are more "hardenable" (i.e. suitable for being hardened) when approaching the center of the final component.

The hardenability gradient thus generated is intended to compensate the decrease in the cooling rate during the quenching between the shell and the core.

To that end, the final properties after quenching and tempering, obtained for various chemical analysis and local cooling rates, are considered. Metallurgical transformation models associated with an estimate of local cooling rates can be usefully employed to achieve this in a predictive manner.

Regarding the tube plates of current steam generators, the grades will preferably be chosen as follows:

The grade of the base 30 is ideally "18 MND 5", according to the current specification, but in a version optimized for a thermal treatment. Its typical analysis in mass percentage is C 0.2, Mn 1.3, Mo 0.5, Ni 0.65.

The grades of the metals deposited to constitute the remainder of plate 1 must present martensite and bainite critical cooling rates lower than those of the further outward previous layer, in order to maintain an overwhelmingly bainitic microstructure with perlite ferrite contents as small as possible (<10%) without exceeding 0.65% in carbon equivalent.

Example

An example based on commercial products is shown in Table 1 below (referred to as "Table 1", including typical chemical analysis, equivalent carbon values, as well as martensite (VcM) and bainite (VcB) critical cooling rates.

These latter values should be compared with the low cooling rates obtained due to the very high thickness of the plate: Cooling rate at 700° C. Vr700 (K/h)=5400, 3300, 1700, 770, 475 respectively at 0, 5, 12, 20, 25 cm depth.

TABLE 1

| Layer | Analysis (%) | | | | | | C* (%) | VcM (K/h) | VcB (K/h) |
|---|---|---|---|---|---|---|---|---|---|
| | C | Si | Mn | Ni | Cr | Mo | | | |
| Base 30 | 0.18 | 0.22 | 1.52 | 0.64 | 0.18 | 0.52 | 0.62 | 93000 | 4100 |
| Inner shell 4 | 0.09 | 0.60 | 1.70 | 1.50 | 0.20 | 0.50 | 0.61 | 54000 | 1510 |
| Core 5 | 0.07 | 0.30 | 1.50 | 2.00 | 0.25 | 0.58 | 0.62 | 49000 | 920 |
| Part 31 of shell 3 | 0.08 | 0.60 | 1.70 | 1.50 | 0.20 | 0.50 | 0.62 | 60000 | 1650 |

FIG. 3 presents hardness results calculated through the plate, in the center thereof, after quenching in water from 865° C., then tempering at 635° C., using the grades shown in Table 1.

The segments visible in the figure bear the numerical reference of the part of the plate 1 to which they relate.

It can be seen that the hardness is extremely homogeneous.

Moreover, the perlite ferrite contents remain below 10% in all the deposited metal, which indirectly indicates that resilience and toughness for these C—Mn—Ni steels will be high.

Indeed, if the real quality criterion of the microstructure is the relative quantity of bainite and martensite, emphasis is also placed on the quantity of ferrite and perlite. A microstructure exhibiting good mechanical properties preferably contains more than 90% bainite+martensite and therefore less than 10% ferrite+perlite.

Consequently, the transformation rate leading precisely to 10% of ferrite+perlite (abbreviated "V10FP" (in K/h)) is also significant.

The above Table could thus be completed as follows:
for base 30: V10FP=1900;
for inner shell 4: V10FP=590;
for core 5: V10FP=335;
for part 31 of shell 3: V10FP=640.

In the example described above, three to four different chemical compositions are used. It can adequately be declined in only two different grades. In these alternatives, it is appropriate to comply with the increasing hardenability evolution of the shells towards the core.

As the geometry of the plate 1 is circular, the deposits are easily but not necessarily made with welding heads that are movable only radially and weld circumferentially.

This avoids the more expensive use of a robot having the dimensions of this manufacturing.

Several welding heads can usefully be used simultaneously or sequentially, for example to make the external and internal passes, or merely to reduce the manufacturing time.

Temperature control devices are advantageously used in order to guarantee the preheating (greater than 150° C.), inter-pass and post-welding (greater than 250° C. for 24 h) temperatures.

For a better manufacturing strategy, this can be done as follows:

a) It is useful but not mandatory to start with the wrought base which will be clamped before welding on a turning device.

b) A peripheral strip can be used to limit the thicknesses to be machined after welding.

c) The construction is done additively, layer by layer, from the lower face to the upper face.

d) Intermediate thermal treatments can be carried out in order to limit deformations and residual stresses (stress relieving treatment above 550° C.), limit the risks due to hydrogen (precautionary treatment), and restore the properties of the underlying material.

e) Intermediate forging operations can be performed to further improve the final properties. Likewise, a final forging can easily be carried out.

f) Stress relieving treatment/first austenitization/air cooling.

g) Blank type machining.

h) Quality treatment with austenitization at low temperature (AC3+40° C.), water quenching, tempering according to the grades used (in the example given above: around 635° C.). AC3 is the conventional designation for the end of alpha/gamma transformation on heating.

The method according to the invention allows for the following advantages:
Main Benefits
    Removal of macro-segregations.
    Homogeneity of mechanical properties throughout the thickness of the plate.
    Better overall mechanical properties, in particular excellent resistance/toughness balance.
Side Benefits
    Great freedom of choice of supplier who no longer needs to have a very large ingot casting capacity.
    Potentially shortened overall manufacturing time.
    Possibility of local repair during manufacture.
    Possibility of intermediate thermal treatments.
    Possibility of intermediate and final forgings.
    Installation more economical than a large forge.

The users of such a technique are potentially steam generator manufacturers, blacksmiths of solid components, boilermakers, blacksmiths, welding equipment and products manufacturers.

The invention claimed is:

1. A solid metal component, which comprises a core and an outer shell which surrounds the core in all directions, the core and the shell being made of different grades of steels, the steel of the core exhibiting martensite and bainite critical cooling rates lower than the martensite and bainite critical cooling rates of the steel or steels of the shell.

2. The solid metal component according to claim 1, wherein the core is itself surrounded by at least one inner shell, the inner shell being surrounded by the outer shell, the steel of the core exhibiting martensite and bainite critical cooling rates lower than the martensite and bainite critical cooling rates of the steel of the inner shell, the martensite and bainite critical cooling rates of the inner shell being themselves lower than the martensite and bainite critical cooling rates of the outer shell.

3. A method of manufacturing a solid metal component according to claim 1, which comprises a step of depositing the different grades of steels by additive manufacturing or welding, on a base previously manufactured which constitutes a part of the outer shell, in order to form at the same time, the core and the remainder of the outer shell.

4. The method according to claim 3, wherein the steel grade of the remainder of the outer shell is the same as that of the base.

5. The method according to claim 3, wherein the steel grade of the remainder of the outer shell is different from the steel grade of the base, the two-steel grades of the remainder of the outer shell and the steel grade of the base exhibiting martensite and bainite critical cooling rates that are identical or almost identical.

6. The method according to claim 3, wherein the base is made by forging or rolling.

7. The method according to claim 3, wherein the base is made by additive manufacturing or welding.

8. A method of manufacturing a solid metal component according to claim 2, which comprises a step of depositing the steel of the inner shells and the steel of the outer shell by additive manufacturing or welding, on a base previously manufactured which constitutes a part of the outer shell, in order to form at the same time, the core and the remainder of the inner shell and of the outer shell.

9. The method according to claim 8, wherein the steel grade of the remainder of the outer shell is the same as that of the base.

10. The method according to claim 8, wherein the steel grade of the remainder of the outer shell is different from the steel grade of the base, the two steel grades exhibiting martensite and bainite critical cooling rates that are identical or almost identical.

11. The method according to claim 8, wherein the base is made by forging or rolling.

12. The method according to claim 8, wherein the base is made by additive manufacturing or welding.

* * * * *